Feb. 2, 1965 P. E. YOST 3,168,266
APPARATUS FOR SUPPORTING AIR-BORNE LOADS
Filed Dec. 22, 1961 2 Sheets-Sheet 1

INVENTOR.
Paul E. Yost
BY
ATTORNEYS

Feb. 2, 1965 P. E. YOST 3,168,266
APPARATUS FOR SUPPORTING AIR-BORNE LOADS
Filed Dec. 22, 1961 2 Sheets-Sheet 2
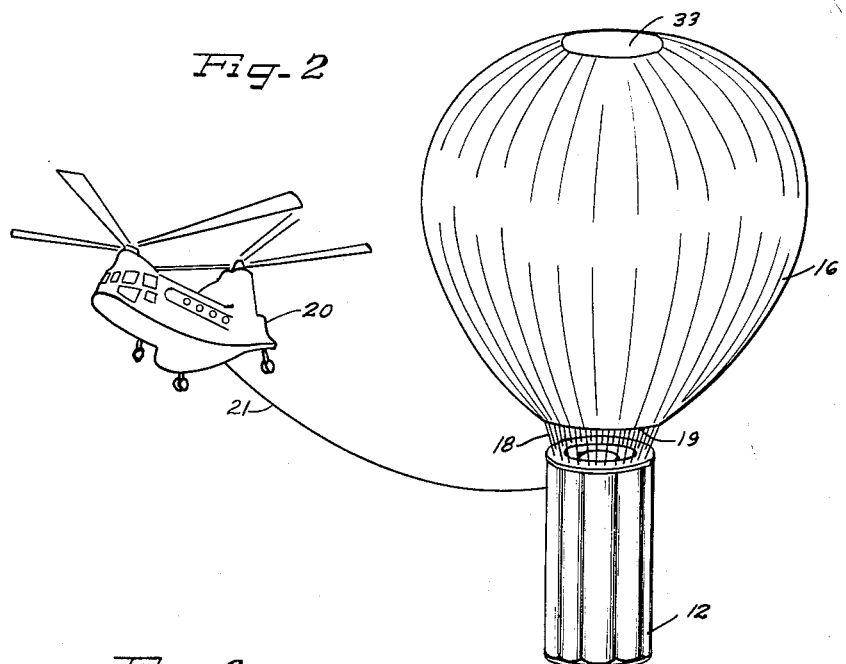
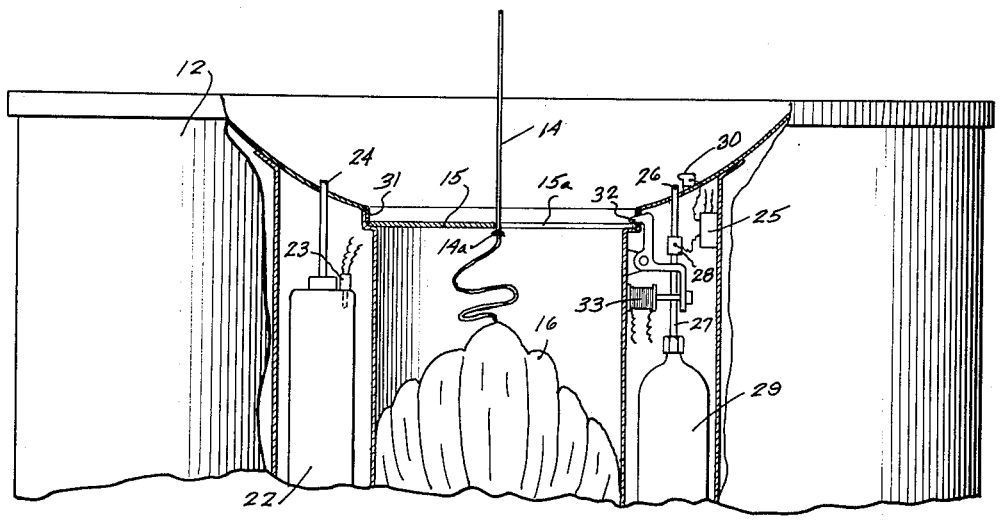
INVENTOR.
Paul E. Yost
BY
ATTORNEYS United States Patent Office 3,168,266
Patented Feb. 2, 1965

3,168,266
APPARATUS FOR SUPPORTING AIR-BORNE
LOADS
Paul E. Yost, Sioux Falls, S. Dak., assignor to Raven
Industries, Inc., Sioux Falls, S. Dak., a corporation
of South Dakota
Filed Dec. 22, 1961, Ser. No. 161,675
7 Claims. (Cl. 244—138)

The present invention relates to a balloon system for mid-air recovery of air-borne heavy loads.

A recovery system is contemplated which is suitable for the recovery of heavy loads which are air-borne by other propelling means, and which must be safely decelerated as they drop downwardly and controllably lowered to the ground. A useful function of the proposed system for example is the recovery of heavy-load, high thrust boosters of rocket propelled vehicles, without water immersion. In the recovery of various air-borne loads such as components from rocket propelled space vehicles it is important to provide transport capability which is integral with the section of the vehicle to be recovered. Recovery system weight and space allocations should be at a minimum to reduce the burn out velocity penalty imposed on the mother vehicle in a space vehicle unit.

The present invention provides a recovery system which is a marriage of a parachute and a hot air balloon. The device utilizes form drag, static head and differential air density to alter the ballistic re-entry trajectory of a booster section of a space vehicle to a low-velocity trajectory which controllably levels off in such a way that the booster section floats above the earth's surface at a controlled low altitude permitting the unit to be towed to a suitable landing space.

A suitable recovery system requires a sequence of operation to achieve the functions of altitude control, deceleration, terminal descent and transfer to a suitable facility. The altitude control operation should orient the booster in an engine-down position with its axis parallel to the re-entry trajectory. This is possible by a conventional drogue parachute and deceleration is possible by drag parachutes but these arrangements however do not permit recovery without water immersion or damaging impact with the ground.

The present invention in a preferred form adapted for recovery of a booster stage employs a collapsed balloon envelope with a parachute size opening at the base carried along with the booster section in a container. Booster orientation and initial deceleration is accomplished by drogue and drag parachute means in a first phase of descent and the balloon is drawn out of the container by the parachute means at the beginning of a second phase of descent and initially pre-inflated by ram air entering the parachute size opening at the balloon base, and pre-inflation is aided and the pre-inflation gases heated by a solid propellant charge acting as a gas generator. Further deceleration and controlled support of the booster section is accomplished by supplying a controlled flow of heated lifting gas to the balloon so that the balloon provides a vertical free lift to support the booster section. The temperature of the heated gases within the balloon is controlled by a controlled burner supported at the base of the balloon and delivering a controlled flow of heated air and burning gases to the balloon through its bottom opening, and the booster floating at the desired altitude is towed to a suitable landing place by a helicopter.

An object of the invention is to provide an improved system for mid-air recovery of heavy loads and for controllably supporting loads carried aloft by propelling means, for lowering the loads by reducing their rate of descent and applying a vertical lifting force to the loads to gradually lower them or support them at a predetermined altitude.

A further object of the invention is to provide an improved structure which functions to provide the advantages of both a parachute and a balloon.

A still further object of the invention is to provide a recovery system employing a hot air balloon avoiding disadvantages of balloons filled with other lighter-than-air lifting gases.

Other objects, advantages and features will become more apparent with the teaching of the principles of the present invention in connection with the disclosure of the preferred embodiments thereof in the specification, claims and drawings, in which:

FIGURE 2 is a perspective view of the load being towed to a landing location; and FIGURE 3 is a diagrammatic fragmentary vertical sectional view taken through the load, which is shown in the form of a booster section.

As shown on the drawings:

Figure 1:
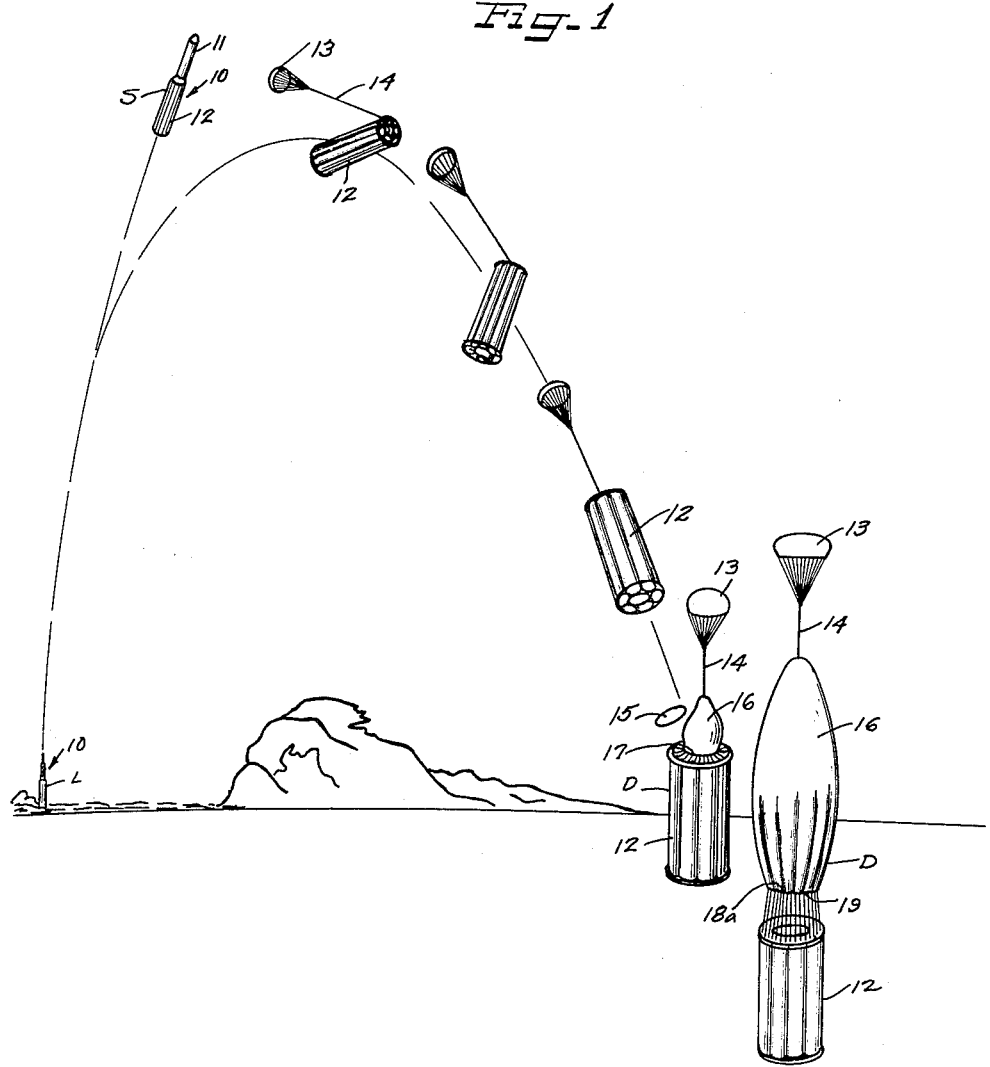
FIGURE 1 is a somewhat schematic perspective showing of stages of operation employing the method and apparatus of the present invention for the recovery of an air-borne load.

FIGURES 1 through 3 show the method and apparatus adapted to recovery of a booster section of a rocket propelled vehicle. Primarily the structure employed in this use or other uses may be regarded as a marriage of a parachute and balloon obtaining advantages of both. The recovery advantages may be employed in other uses for the controlled descent or recovery of air-borne loads of various altitudes. The system may be employed, for example in recovery of units after re-entry into the earth's atmosphere from orbital travel around the earth or from space travel, or this system may be employed as a safety arrangement for the lowering of disabled aircraft. As will be understood the system may be employed to either reduce and control the rate of descent of a load until it reaches the earth or to retard the rate of descent and thereafter support the load at a predetermined altitude and the employment of a controlled delivery of hot air to the balloon makes possible the regulation of its free lift and the altitude at which the load is supported.

As shown in FIGURE 1, a rocket propelled vehicle 10 is shown at the launch position L and upon ignition and operation of the rocket motors rises. The vehicle 10 is shown with a body portion 11 and a booster portion 12 containing the rocket motors shown schematically in cluster arrangement. Additional booster stages frequently will be employed but for simplicity the vehicle is shown in operation as separating the single booster 12 from the body section 11 at the separation stage shown at position S.

Separation is illustrated as being at 75,000 feet and after separation a drogue parachute 13 is released from the booster section 12, which may be referred to as the load, and has a line 14 connected to the upper end of the booster. This orients the booster which has an overall general cylindrical shape so that it turns to an engine-down position with its axis parallel to the re-entry trajectory. A single drogue parachute 13 is shown which functions primarily for orientation although some drag effect will be experienced retarding the rate of descent a small amount. Additional drag parachutes may be employed although not normally necessary with the present arrangement since even if a satisfactory descent rate is attainable with a parachute system such a system does not permit recovery of the booster without water immersion or damaging impact with the ground. Accordingly at a lower altitude, shown as about 30,000 feet, a balloon envelope 16 carried aloft with the booster will be deployed to function to slow the descent rate of the booster and to thereafter apply a lifting force adequate to support it at a desired altitude.

It is to be understood that while the balloon envelope 16 is referred to as a balloon, this is for convenience of reference only and the unique function of resultant action of a parachute effect and the balloon effect is obtained by the design of the envelope and its accompanying mechanism.

The drogue parachute 13 has its load line attached to the upper end of the balloon 16 and the balloon will be held within a compartment 17 within the booster until it is deployed. Deployment is shown as being effected by the release of a cover 15 which normally closes the compartment 17 and holds the balloon 16 therein. This cover will be suitably held in place and released by a control mechanism as will be further described in connection with FIGURE 3.

The balloon 16 is essentially a shaped balloon with a large open bottom apex 19. This opening is of parachute size to cause the balloon to function as a reefed parachute and as soon as the balloon is deployed it becomes inflated by ram air due to its downward passage through the air. This very rapid inflation expands the balloon to a static pressure approximately equal to the dynamic head at the apex opening. The combination of static flat plate head resistance plus the drag of the inflated balloon then determines a new deceleration below the critical deceleration.

The balloon envelope is formed of a lightweight strong material such as a lamination of an outer woven fabric with an inner gas impervious plastic liner. An outer lightweight woven layer of nylon covered with an inner thin lightweight layer of Mylar provides a laminate which may weigh on the order of 0.011 pound per square foot and provides a lightweight unit for carrying aloft with the booster. The material is suitable for re-use and holes or tears can be repaired. Because the balloon is inflated during flight with a continuous supply of hot air which flows up through the center of the opening at the base and cools as it circulates to the outer inner surface of the balloon, leaks in the material do not substantially adversely affect the lift performance of the balloon.

The balloon envelope is preferably formed with a "natural" shape for hot air, as will be recognized by those versed in the art, and can be formed of vertical gores suitably attached such as by sewing. The bottom apex opening can extend up to 30% of the vertical gore length. Around the edge of the opening 19 at the base of the balloon 16 are attached load lines 18 which extend downwardly to attach to the load and are shown as anchored around the periphery of the top end of the booster 12. The load lines are suitably attached to the balloon such as to a tape 18a sewed at the lower end of the balloon gores.

After the balloon has been deployed and rapidly inflated by the action of the air entering through the open bottom, a high energy heat source is used to heat the air in the balloon. This may be provided by a charge of solid fuel which burns rapidly to deliver rapid flow of heated gases to the balloon. The warm gases within the balloon then cause it to become buoyant so that further deceleration of the load and flight train occurs. This occurs at position D as shown in FIGURE 1.

While the preferred arrangement is described and illustrated, in some utilizations the initial rapid pre-inflation may be made by mere deployment of the balloon without the utilization of the solid charge for heating the air in the balloon. Heat will then be supplied by the gas burner, as will be described. In other utilizations the initial rapid pre-inflation with heated gas may take place immediately as soon as the reefed balloon has been drawn from its container within the load.

After pre-inflation of the balloon, and upon burn out of the solid charge in the arrangement shown in FIGURE 1, a propane burner located at the bottom apex of the balloon is ignited. This increases the temperature of the warm gases within the balloon to cause it to become buoyant so that further deceleration of the flight train occurs and as the balloon becomes warmer its buoyancy increases until it is able to support the booster. Modulation of the fuel input to the burner can be used to establish the final floating altitude which is illustrated as being 3,000 feet to 5,000 feet. At that floating altitude a tow vehicle in the form of a helicopter 20 is brought into position alongside the balloon and a tow line 21 attached to the booster 12 so that it can be towed to a suitable landing location. If the time in the air is to be substantial, the tow line 21 can incorporate a fuel supply line and additional fuel can be fed to a fuel container for the burner to continue operation of the burner over a desired period of time. This fuel line may also be supplied from a ship below if the load is over water, with the load floating at an altitude sufficiently low to make it possible to extend a fuel line between the ship and the load.

FIGURE 3 illustrates a construction that may be used for mounting elements for providing the rapid heat source for preliminary inflation and the burner for continued hot air inflation of the balloon 16. A solid fuel container 22 is supported beside the container or compartment 17 from which the reefed balloon 16 is withdrawn. The solid fuel container has a suitable igniter 23 and a discharge nozzle 24 which discharges the heated burning gases upwardly into the opening 19 at the balloon base. The igniter 23 is of a type which may be electrically operated such as by an altitude controlled switch mechanism 25. It will of course be recognized that the solid fuel igniter 23 may be ignited by other means such as by being started a timed period after the reefed balloon 16 is withdrawn, or it may be operated by radio transmitted control signals from the ground.

A fuel burner 26 is shown positioned to direct heated gases and air upwardly into the open balloon base 19. The burner 26 is shown schematically although an aspirator may be employed to obtain the proper mixture of air and burning gases to flow up into the balloon. The nozzle 24 for the solid fuel and the burner 26 are shown suitably positioned at the top of the booster so that the gases will flow into the large base opening, although suitable mechanism may be employed to raise them upwardly more close to the balloon opening 19, if necessary. Fuel is supplied to the burner 26 through a fuel line 27 from a fuel container 29 controlled by a solenoid valve 28. An igniter 30 is provided for starting the burner when the valve 28 is opened, and this mechanism may also be controlled by the altitude switch apparatus 25, or may be otherwise suitably controlled. The altitude switching apparatus 25 may employ modulating control apparatus controlling the opening of the valve 28 to regulate the burner 26 to thereby change the rate of delivery of heated gases and air into the balloon and maintain the balloon floating at a generally constant altitude. In other words, as the balloon descends a pressure responsive switch may increase the flow of fuel to the burner to increase the delivery of hot air to the balloon. Similarly as the balloon ascends a pressure responsive control may decrease the flow of fuel to the burner 26. A simplified propane supply fuel tank 29 is shown but other forms of non-pressurized fuel supplies may be employed which accommodate simple delivery through a fuel supply line incorporated in the tow line 21 shown in FIGURE 2.

Suitable apparatus may be employed for holding the balloon within its container compartment 17 until it is deployed at position D at FIGURE 1, and this is shown somewhat schematically by a cover holding lip 31 and a latch 32 which will hold the cover 15 in place until the balloon envelope 16 is to be deployed. The latch 32 can be held locked, and released by the pressure switch mechanism 25 operating a solenoid 33 or the solenoid can be operated by remotely controlled release apparatus. The cover may have a slot 15a so that it can separate from the line 14, and the line may have an enlarged stop 14a to secure the line to the cover for applying the force of the parachute 13 to the load.

The balloon envelope with the pre-inflation arrangement and hot air supply is particularly well suited for very heavy loads inasmuch as the buoyancy of a hot air balloon increases as a third power of its diameter, whereas its heat losses increase at the second power of its diameter. Thus with increase in size the efficiency of the system increases.

As an example of heavy load recovery, a balloon construction which is approximately 254 feet in diameter can recover a 90 ton booster and conveniently carry a half hour's fuel supply for low altitude transport. The total weight of the recovery system will be approximately 4.5% of the total booster weight. For a smaller weight load recovery wherein a booster for example may weigh 2,480 pounds, the total weight of the recovery system would be approximately 300 pounds or 12% of the booster weight. This performance is based on an internal aerostat temperature of 330° F. above an ambient temperature of 70° and a final floating altitude of 5,000 feet with the use of liquid propane fuel at 20,000 B.t.u./lb.

These relatively low weights would not be possible if inflation with a lighter-than-air gas other than hot air were contemplated. For lifting gases having lighter-than-air characteristics, a molecular weight of the gas will displace a molecular weight of air and the difference between the two weights is the total lift available to the balloon afforded by the gas. For a combustible fuel, the heat of combustion is used to elevate the temperature of the mass of air so that it has a lower density than the ambient air. It must be noted that the actual weight of this lifting medium, heated air, is considerably greater than that of the light gases, helium and hydrogen. The advantage of using heated air is that it is "free." It does not have to be lifted, carried, stored or in any way related to the load prior to the recovery sequence, and only the fuel need be carried aloft. The heat of combustion of the typical fuel, propane at 20,000 B.t.u. per pound will raise the temperature of 830 pounds of air 100° F. At standard conditions for ambient air this mass of heated air will support 132 pounds.

The size of the balloon envelope employed with the present system is considerably larger than would be required with corresponding helium or hydrogen balloons. This larger size functions as an advantage of the system to act as a parachute at high altitudes. With lightweight fabrics the take-off weight of the entire hot air balloon system compares very favorably with that which would be required for a hydrogen balloon system which did not employ the advantages of the parachute effect, and the hot air system is much lighter than a balloon which would employ helium as a lifting gas, and the use of compressed helium or hydrogen in atmospheric temperature requires tanks of impractically large weights. Further, the hot air balloon system complete with fuel can be packed and stored indefinitely and safely without attention prior to take-off. The volume penalty at take-off of the hot air balloon envelope as compared with a hydrogen or helium system is generally 20%, but the overall system is smaller since the lift gases do not have to be carried aloft and the helium, even when liquefied, still occupies about 1/700 of its gaseous volume and hydrogen about 1/800 of its gaseous volume.

Further, during the last stages of recovery process when the booster is being maneuvered into its landing site, another inherent advantage of the hot air balloon is that its lift instead of being controlled by ballast and gas valving can be controlled by modulating the fuel supply which can be readily done by radio control or an electrical link from the helicopter which tows the balloon.

For landing, the helicopter tows the buoyant system to a desired location such as to a landing ship dock or land based cradle. When let out is desired, the burner rate is reduced by override controls to produce the desired rate of descent at exact let down time the balloon and load are maneuvered into position above the receiving cradle and burner shutoff can lower the load into the cradle, or if desired, a large deflation port may be opened in the balloon top apex such as by blowing out a patch 33 at the balloon top, FIGURE 1. After deflation the balloon and burner can be inspected and repaired for re-use.

It has been found that the amount of initial heating required per pound of pay load does not change greatly as heavier loads are lifted. A temperature of 250° F. is contemplated to conform to safe practice with materials such as Mylar-nylon laminations, above described. Other fabrics will permit increased safe operating temperatures such as on the order of 400° F.

As a summary of operation, mid-air recovery of a heavy load is shown in FIGURE 1 after the load 12 has been oriented, by deployment of the balloon envelope 16 and rapid inflation thereof. Rapid inflation is accomplished by air entering the large parachute size opening 19 at the base or by a rapid supply of air from another source, which air may be heated, or by a combination of both systems. The balloon offers a parachute descent slowing effect as the load descends. The period of descent can be used for increasing the temperature of the gases within the balloon such as by a burner at the balloon base and by regulation of the hot air supply to the balloon. The rate of descent can be controlled and the load can be caused to float at a desired altitude.

Thus it will be seen that I have provided an improved method and apparatus for mid-air recovery of air-borne loads which meet the objectives and advantages above set forth. The system is reliable and relatively inexpensive and offers features of control heretofore not available.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A system for recovering an air-borne load which comprises a parachute connected to the load for carrying aloft and for ejection at the beginning of a first phase of load descent to reduce the rate of descent of the load, a balloon envelope connected to the load at its lower end and connected to the parachute, means releasing the balloon at the beginning of a second phase of descent for being drawn away from the load by the parachute, means rapidly pre-inflating the balloon at the beginning of the second phase, and means for inflating the balloon with heated gas during said second phase for applying a vertical supporting lift to the load.

2. A mechanism for supporting an air-borne load which comprises a balloon envelope to be carried aloft in collapsed condition with the load, a container for the envelope, means removing the envelope from the container when the balloon is aloft, a load attachment means on the balloon for attachment to the load, means for inflating the balloon with a heated gas after the envelope has been removed from the container, a burner mounted at the base of the balloon envelope for heating air passing upwardly through an opening in the balloon envelope, means initiating operation of the burner after the balloon has been inflated for heating the gas within the inflated balloon, and a fuel supply means connected to the burner having a variable control for regulating the temperature of the gas delivered to the balloon envelope to control the free lift applied to the load.

3. An air-borne supporting system for a load comprising a balloon envelope for applying a vertical lifting force to the load having a load attachment means for attachment to the load, a container for the envelope to carry the envelope aloft in a collapsed condition with the load, means for ejecting the balloon envelope from the container, first gas generating means for rapidly pre-inflating the ejected balloon envelope, and second gas generating means including a hot air inflator at the base of the balloon directing a flow of heated gas upwardly into the balloon envelope at a rate slower than said first means for increasing the free lift and applying a vertical lifting force to the load.

4. A mechanism for supporting an air-borne load which comprises a balloon envelope for carrying aloft in collapsed condition with the load, a load attachment device on the balloon for connecting to the load, and gas generating means carried with the balloon envelope delivering gas at a first rate for rapidly inflating the balloon when aloft and thereafter delivering gas at a second rate for heating the gas within the inflated balloon envelope to increase its lift and apply vertical lift to the load, said gas generating means delivering gas at said first rate and providing the initial inflation of said balloon from a collapsed condition when the balloon is aloft, said gas generating means delivering gas at said second rate only after the balloon is aloft.

5. A mechanism for supporting an air-borne load which comprises a balloon envelope for carrying aloft in collapsed condition with the load, a load attachment device on the balloon envelope for connecting to the load, first gas generating means carried with the balloon envelope delivering gas at a high rate for rapidly inflating the balloon envelope when aloft, said first gas generating means providing the initial inflation of said balloon envelope from a collapsed condition when the balloon envelope is aloft, and second gas generating means connected to the balloon envelope generating gas for delivering heated gas to the inflated balloon envelope to increase its lift and apply vertical lift to the load, said first and said second gas generating means operating only after the balloon envelope is aloft.

6. A balloon system for mid-air supporting of loads comprising a balloon envelope having an opening at the end for capturing air retarding forward velocity upon deploying the envelope with the opening exposed, load line means attached to the envelope for attachment to a load beneath the envelope, means containing the envelope with the load while the load is sent aloft, means for deploying the envelope aloft from the load behind the load for capturing air while the load pulls the envelope after it, and means connected to said balloon envelope operative after the envelope is deployed and initially inflated from a collapsed condition with captured ambient air for delivering a flow of heated gas through said opening for producing a lighter than air atmosphere within the balloon envelope and providing a vertical lift for the load, said gas delivering means operating only after the balloon envelope is aloft.

7. A mechanism for supporting an air-borne load which comprises a balloon envelope to be carried aloft in collapsed condition with the load, a load attachment device on the balloon envelope for attachment to the load, means forming an opening in the balloon envelope for capturing air as the balloon envelope is pulled by the moving load, means deploying the envelope aloft for capturing air as the load is moving, said balloon envelope being deployed initially from a collapsed condition when the balloon envelope is aloft, and means connected to said balloon envelope for heating gas within the balloon envelope after the envelope is deployed and at least partially inflated with captured air to increase its lift and apply vertical lift to the load, said gas heating means operating only after the balloon envelope is aloft.

References Cited in the file of this patent

UNITED STATES PATENTS

| 1,043,836 | Hodge | Nov. 12, 1912 |
| 2,478,758 | Frieder et al. | Aug. 9, 1949 |
| 2,892,602 | Servanty | June 30, 1959 |
| 2,967,677 | Winzen et al. | Jan. 10, 1961 |
| 3,120,932 | Stamer | Feb. 11, 1964 |

FOREIGN PATENTS

| 240,341 | Sweden | Dec. 15, 1945 |
| 17,383 | Great Britain | 1902 |
| 555,831 | Great Britain | Sept. 9, 1943 |

OTHER REFERENCES

Aviation Week, p. 67, July 11, 1960.
Flight Magazine, pages 774, 775, June 27, 1952, volume LXI, No. 2266.
Aviation Week Magazine, page 104, June 13, 1960, vol. 72, No. 24.